(12) United States Patent
Bierhuizen et al.

(10) Patent No.: US 7,375,867 B2
(45) Date of Patent: May 20, 2008

(54) TRANSMISSIVE ELECTROMECHANICAL LIGHT VALVE AND SYSTEM

(75) Inventors: Serge J. A. Bierhuizen, Santa Rosa, CA (US); David Elliot Slobodin, Lake Oswego, OR (US)

(73) Assignee: Infocus Corporation, Wilsonville, OR (US)

( * ) Notice: Subject to any disclaimer, the term of this patent is extended or adjusted under 35 U.S.C. 154(b) by 66 days.

(21) Appl. No.: 11/073,256

(22) Filed: Mar. 4, 2005

(65) Prior Publication Data

US 2006/0198002 A1 Sep. 7, 2006

(51) Int. Cl.
*G02B 26/08* (2006.01)

(52) U.S. Cl. .................. 359/196; 359/230; 359/315; 359/223

(58) Field of Classification Search ............... 359/196, 359/230

See application file for complete search history.

(56) References Cited

U.S. PATENT DOCUMENTS

| | | | | |
|---|---|---|---|---|
| 6,034,807 A | * | 3/2000 | Little et al. ................. | 359/227 |
| 6,130,771 A | * | 10/2000 | Chertkow .................... | 359/227 |
| 6,268,908 B1 | * | 7/2001 | Bula et al. .................... | 355/71 |
| 6,671,078 B2 | * | 12/2003 | Flanders et al. ............. | 359/254 |
| 6,775,048 B1 | * | 8/2004 | Starkweather et al. ....... | 359/291 |
| 6,906,847 B2 | * | 6/2005 | Huibers et al. .............. | 359/291 |
| 7,055,965 B2 | | 6/2006 | Koba | |
| 7,123,216 B1 | * | 10/2006 | Miles ........................... | 345/54 |
| 2003/0085849 A1 | * | 5/2003 | Grabert ........................ | 345/30 |
| 2004/0233498 A1 | * | 11/2004 | Starkweather et al. ....... | 359/230 |
| 2005/0053801 A1 | * | 3/2005 | Elschner et al. ............. | 428/690 |
| 2005/0225827 A1 | * | 10/2005 | Kastalsky .................... | 359/245 |
| 2006/0033676 A1 | * | 2/2006 | Faase et al. .................. | 345/30 |
| 2006/0103815 A1 | * | 5/2006 | Peterson ....................... | 353/88 |

* cited by examiner

*Primary Examiner*—Jessica T Stultz
(74) *Attorney, Agent, or Firm*—Schwabe Williamson & Wyatt

(57) ABSTRACT

An apparatus, system, and method for a transmissive electromechanical light valve including a gate pivotable between a first position to allow light to pass through a valvelet and a second position to prevent light from passing through the valvelet are disclosed herein. Other embodiments may be described and claimed herein.

15 Claims, 4 Drawing Sheets

TRANSMISSIVE ELECTROMECHANICAL LIGHT VALVE AND SYSTEM

FIELD OF THE INVENTION

Embodiments of the invention relate generally to the field of projection systems, and more particularly to a transmissive electromechanical light valve.

BACKGROUND OF THE INVENTION

Multimedia projection systems have become popular for purposes such as conducting sales demonstrations, business meetings, classroom training, and for use in home theaters. In typical operation, multimedia projection systems receive analog video signals from an input device and convert the video signals to digital information to control one or more digitally driven light valves. Depending on the cost, brightness, and image quality goals of the particular projection systems, the light valves may be of various sizes and resolutions and may be employed in single or multiple display configurations.

One type of light valve found in projection systems is a digital micromirror device (DMD). A DMD uses individually controllable mirrors to selectively reflect light either through projection optics or towards a light-absorbing surface, based on image data. Because the DMD operates by selective reflection, the axis of illumination needs to be separated from the axis of projection.

This off-axis illumination could add to the expense and/or sacrifice the compactness of the system. Due to the reflective operation of the DMD, the illumination optics must present light to the same face of the DMD that the projection optics receive light from. This requires either complex optics at the DMD face, or it requires the elements of the two optical systems be placed at distances from the DMD sufficient to allow for unfettered presentation/reception of the light. The physical separation of the components of these prior art systems typically make up a significant portion of the total packaging volume of the system, while necessitating additional optical elements, such as relay lenses, to provide proper illumination at downstream components. Additionally, off-axis illumination could result in oblique illumination of the face of the light valve, which could present additional difficulties.

Other types of light valves, e.g., liquid crystal display (LCD) light valves, operate by selectively rotating polarized light. The light that is incident upon the LCD light valve must be polarized to one polarization state, which could result in increased complexity and decreased light transmission through the system.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include a transmissive electromechanical light valve and methods practiced thereon.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments. In particular, a wide variety of optical components such as, but not limited to, prisms, mirrors, lenses, and integration elements may be used as appropriate to fold, bend, or modify the illumination for the intended application. Integration of these optical components into illustrated embodiments may not be specifically addressed unless it is necessary to develop relevant discussion of embodiments of the present invention.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
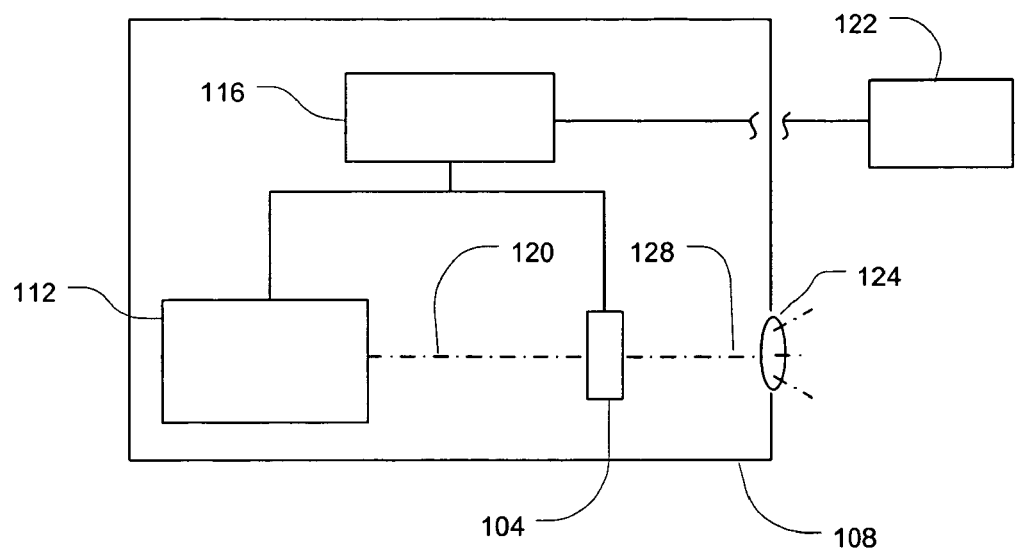
FIG. 1 is a simplified block diagram of a projection system with a transmissive electromechanical light valve, in accordance with an embodiment of the present invention.

FIG. 1 illustrates a simplified block diagram of a projection system 100 with a transmissive electromechanical light valve 104 in accordance with an embodiment of the present invention. A projection device 108 may include an illumination arrangement 112, coupled to a controller 116 and optically coupled to the light valve 104 to provide light along an illumination path 120. The illumination arrangement 112 may provide light with desired characteristics to the light valve 104. These characteristics could include, but are not limited to, illumination uniformity, angle, color, and brightness. The illumination arrangement 112 may include a light source optically coupled to a series of optics including, for example, illumination lenses, integration devices, filters, and/or light-directing components (e.g., mirrors, prisms, light guides, etc.).

In one embodiment the illumination arrangement 112 may include a polychromatic light source such as, but not limited to, an incandescent lamp (e.g., tungsten halogen) or a gaseous discharge lamp (e.g., a metal halide). In other embodiments, monochromatic light sources such as light-emitting diodes, for example, may be used to produce light of a particular color.

In various embodiments, the system 100 may also include more than one light valve 104. For example, a color-specific light valve may be placed in each of a number of primary colored paths and be used to exclusively modulate the light of these paths. In these embodiments, the illumination arrangement 112 may include optics to facilitate the presentation of colored light to the appropriate light valves along the appropriate illumination paths.

The controller 116, which may include both power and logic circuitry, may be adapted to transmit control signals to the light valve 104 based, at least in part, upon input signals received from an input device 122. The control signals may cause matrix-addressable valvelets to selectively transmit incident light in order to effectuate the rendering of the image conveyed by the input signals. Projection optics 124 may be positioned adjacent to the light valve 104 to project the image rendered at the light valve 104, conveyed by light rays transmitted along a projection path 128, onto a screen or other mechanism for viewing. The rendered image may be, for example, image frames of a video. The projection optics 124 may include, but are not limited to, projection lenses, filters, and light-directing components.

For the purpose of this description, a still image may be considered as a degenerate or special video where there is only one frame. Accordingly, both still image and video terminologies may be used in the description to follow, and they are not to be construed to limit the embodiments of the present invention to the rendering of one or the other.

The input device 122 may include a personal or laptop computer, a digital versatile disk (DVD), a set-top box (STB), a video camera, a video recorder, an integrated television tuner, or any other suitable device to transmit signals, e.g., video signals, to the projection device 108. In various embodiments, the system 100 may be, for example, a projector or a projection television.

Figure 2:
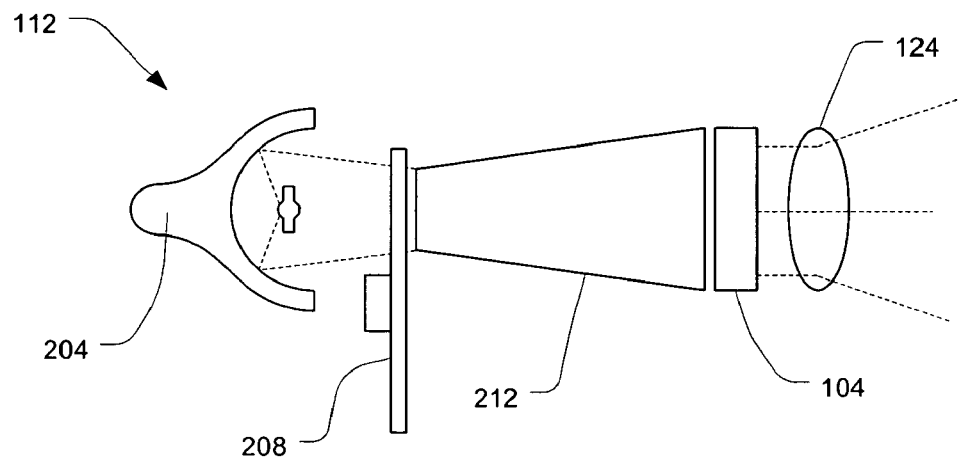
FIG. 2 illustrates a side-view of illumination optics, the transmissive electromechanical light valve, and projection optics in accordance with an embodiment of the present invention.

FIG. 2 illustrates various components of the illumination arrangement 112 disposed relative to the light valve 104 and projection optics 124, in accordance with an embodiment of this invention. A light source 204 may generate polychromatic light that is directed towards color filter segments of a color wheel 208. The color wheel 208 may have color filter segments, e.g., red, green, and blue, as well as other filter segments to provide additional brightness (e.g., white) or desired color balance (e.g., light-purple to correct for the red deficient nature of typical polychromatic light). The color wheel 208 may transmit color sequential light into an integrating device such as an integrating tunnel 212. In various embodiments, other color-filtering devices may be used. Additionally, other embodiments, e.g., ones employing monochromatic light sources, may not have a color-filtering device.

The integrating tunnel 212 may be composed of a solid glass rod that relies on total internal reflection to transfer light through it and to create, at its output end, a substantially uniform illumination field. The integrating tunnel 212 may include a cladding or reflective mirrored sidewalls that may protect internal reflection. The integrating tunnel 212 may have a tapered output end having an aspect ratio that corresponds to an aspect ratio of the light valve 104. The shaped and integrated light may then be presented to the light valve 104 along an illumination path that is substantially orthogonal to the face of the light valve 104, in accordance with an embodiment of the present invention. In various embodiments, other integrating devices such as, but not limited to, a hollow integrating tunnel with reflective sidewalls or a flyseye-lens integrator may be used.

This orthogonal arrangement of this embodiment may prevent the oblique illumination of the transmissive electromechanical light valve 104. Additionally, because the illumination arrangement 112 is presenting light to a different face of the light valve 104 than the projection optics 124 are receiving light from, elements from both of these components may be placed closer to the light valve 104. This may, in turn, facilitate smaller elements being used. For example, in a prior art system, the first element of the projection lens would need a back focal length that was long enough to allow light to be presented to a DMD unobstructed. However, the further that the element is placed from the DMD, the larger the element has to be in order to accept diverging light rays. Unlike the prior art system, the positioning of the projection optics 124 relative to the light valve 104 of the present embodiment is not constrained by the positioning of the elements of the illumination arrangement 112 relative to the light valve 104. Therefore a smaller, more compact system may be enabled by the use of the transmissive electromechanical light valve 104 of embodiments of this invention.

Figure 3:
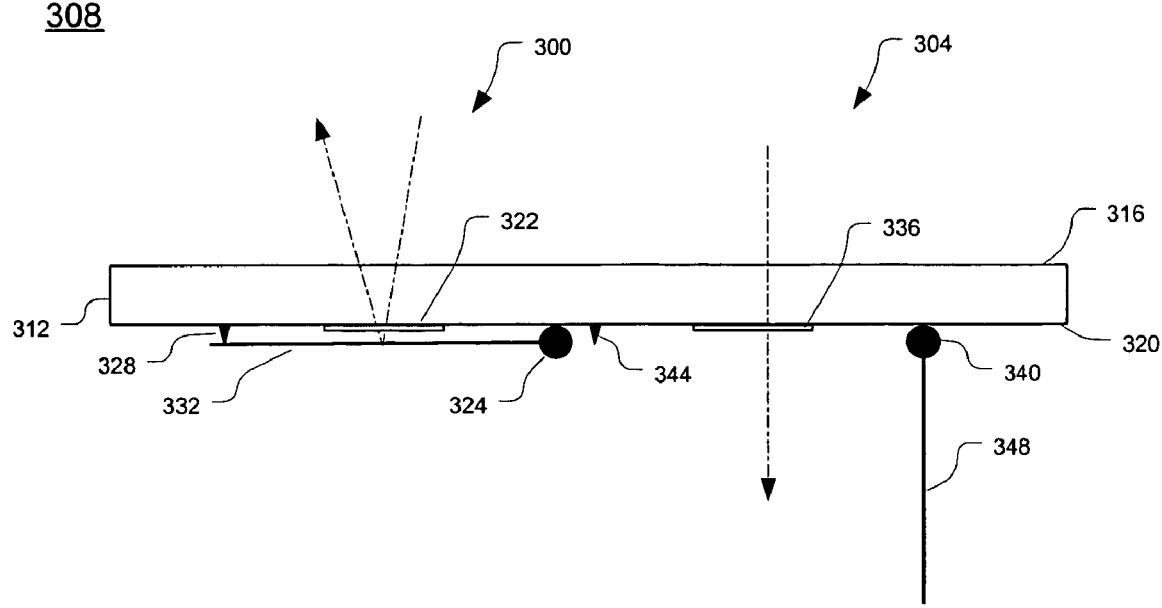
FIG. 3 illustrates a top-view of a transmissive electromechanical light valve having gates and electrodes coupled to a substrate, in accordance with an embodiment of the present invention.

FIG. 3 illustrates valvelets 300 and 304 of a transmissive electromagnetic light valve 308 in accordance with an embodiment of the present invention. The valvelets 300 and 304 may operate to selectively control the passage of light through portions of the light valve 308. The light valve 308 may have a transparent substrate 312, which is common to both valvelets 300 and 304, that has a surface 316 facing illumination optics and a surface 320 facing projection optics.

The valvelet 300 may include a transparent electrode 322, a hinge 324, and a landing 328 coupled to the surface 320 as shown. The valvelet 300 may also include a gate 332 that is coupled to the hinge 324 in a pivotable relationship. The gate 332 may be made of a conductive material and have a reflective surface. As shown in FIG. 3, the gate 332 of the valvelet 300 may be in a closed position such that light transmitted through the substrate 312 (and possibly the electrode 322 as well) at the area of the valvelet 300 may be reflected by the gate 332 back through the substrate 312 and out from the surface 316. In another embodiment, the gate 332 may have a non-reflective surface to absorb the light.

In one embodiment, the gate 332 may be biased to the closed position by a rotational force applied to the gate 332 through the hinge 324. In other embodiments, the gate 332 may be biased to an open position.

Valvelet 304 may include elements similar to those found in valvelet 300 including a transparent electrode 336, a hinge 340, a landing 344, and a gate 348. As shown, the gate 348 of the valvelet 304 may be in an open position such that light transmitted through the substrate 312 (and possibly the electrode 336 as well) at the area of the valvelet 304 may be emitted out towards projection optics that face the surface 320.

Light that is transmitted through the valvelet 304 may not be completely collimated, with some of the light drifting from one side of the valvelet 304 to the other as it passes through. Light having this lateral drift may be reflected off of the open gate 348 and out towards the projection optics in order to prevent an effective reduction of the aperture ratio caused by the gate 348.

In one embodiment, the valvelet 304 may be operated by applying an electrical charge to the electrode 336 such that a repulsive electromagnetic force exists between the gate 348 and the electrode 336. This repulsive force may overcome the rotational bias applied by the hinge 340 and cause the gate 348 to rotate around the hinge 340 and away from the electrode 336. Releasing the charge to the electrode 336 may allow for the rotational force to restore the hinge to the closed position.

In one embodiment, the electrodes 322 and 336 may be electrically coupled to an underlying memory circuit. This memory circuit may be capable of independently addressing the electrodes 322 and 336 in a manner to dictate their respective charges. In one embodiment, the electrodes 322 and 336 may be embedded and/or disposed within the substrate 312.

In other embodiments, an electrical charge may be applied to the gate 348 through the hinge 340 and the electrodes 322 and 336 may be part of a conductive plane disposed within the substrate 312.

The landings 328 and 344 may provide a station for proper disposition of the gates 332 and 348, respectively, while in the closed position. In various embodiments, the landings 328 and 344 may be electrodes with the same potential as the gates 332 and 348 to facilitate the electrical biasing of the gates 332 and 348. In other embodiments, the landings 328 and 344 may be made of a dielectric material.

In one embodiment, a proper closed disposition may hold the gates 332 and 348 apart from the respective electrodes 322 and 336 by a distance. The distance may be large enough to prevent arcing between the two conductors but small enough to allow a sufficient electromagnetic force to effectuate a rotation from the closed position to an open position.

Separation between a gate and an electrode may not be needed in an embodiment with electrodes embedded or disposed within a substrate. However, a landing may still be used in these embodiments for other reasons, such as, but not limited to, electrically biasing the gate and/or preventing contact between the gate and the transparent surface which may compromise one or both of the surfaces.

The magnitude of the electromagnetic force between a gate and an electrode may determine the rotation of the gate. In one embodiment, the gates may be driven digitally between a fully open and a fully closed position. Grayscale imaging may be provided through pulse width modulation in this digital fashion. In another embodiment, the electromagnetic force may be exerted to partially rotate the gate. This could allow an analog grayscale to be used by only allowing a portion of the light to pass.

Figure 4:
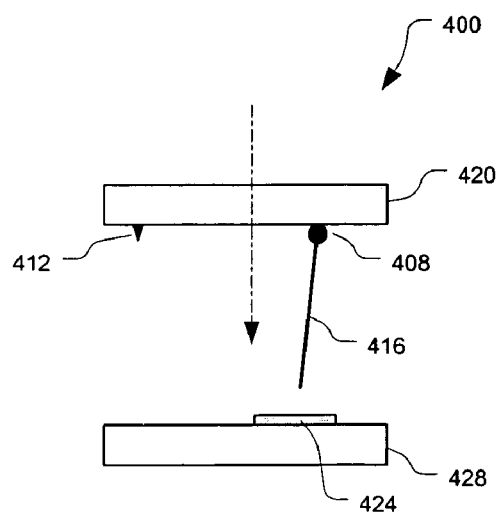
FIG. 4 illustrates a top-view of a transmissive electromechanical light valve having gates and electrodes coupled to separate substrates, in accordance with another embodiment of the present invention.

FIG. 4 illustrates a valvelet 400 of a light valve 404 in accordance with an embodiment of the present invention. The valvelet 400 may have elements similar to comparable elements of valvelets 300 and 304, including a gate assembly having a hinge 408, a landing 412, and a gate 416. In this embodiment the gate assembly may be coupled to a transparent substrate 420 while a transparent electrode 424 is coupled to another transparent substrate 428. In this embodiment, an electrical charge may be applied to the electrode 424 such that an attractive electromagnetic force is exerted between the gate 416 and the electrode 424. Releasing the charge applied to the electrode 424 may allow the restoring force, exerted by the hinge 408, to transition the gate 416 into the closed position.

In this embodiment, the substrate 420 may be separated a distance from the substrate 428 that would provide the gate 416 sufficient clearance to transition between the open and closed positions. Additionally, the distance may be small enough such that an electromagnetic relationship exists between the two conductors. The substrates 420 and 428 may facilitate the encasing of the movable parts of the light valve 404 in order to protect the parts from particulates and other environmental interference.

Figure 5:
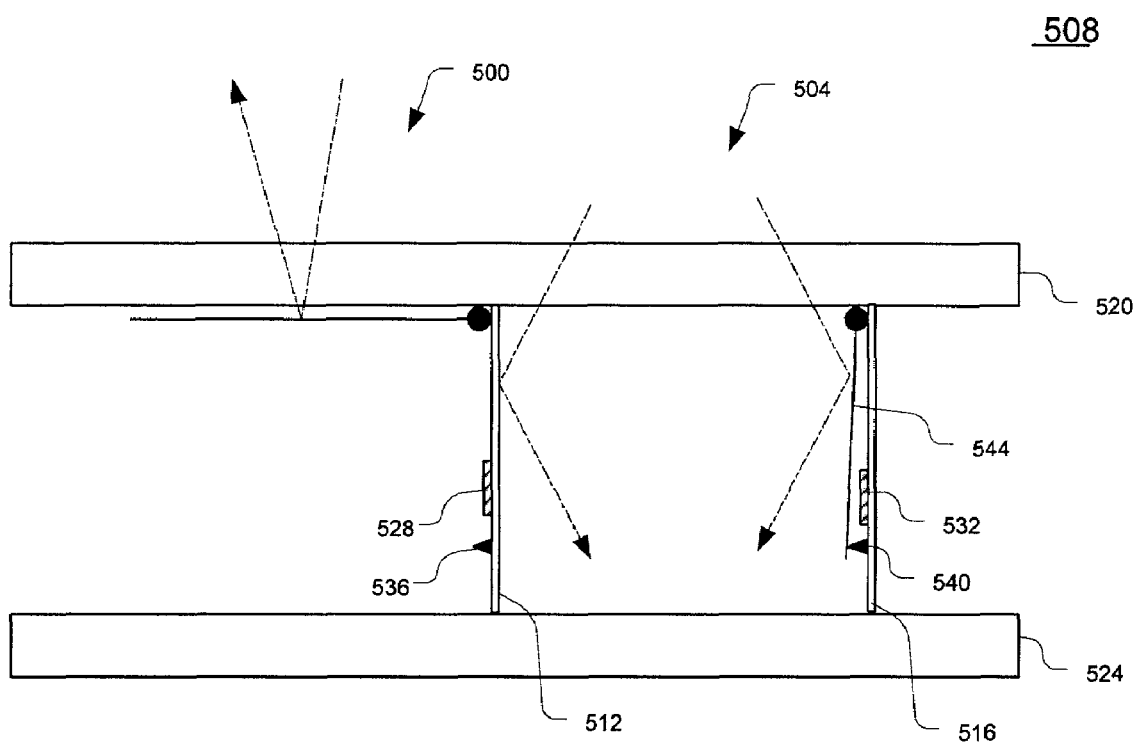
FIG. 5 illustrates a top-view of a transmissive electromechanical light valve having gates coupled to a substrate and electrodes coupled to spacers disposed between substrates, in accordance with another embodiment of the present invention.

FIG. 5 illustrates valvelets 500 and 504 of light valve 508 in accordance with an embodiment of the present invention. This embodiment may have spacers 512 and 516 coupled between substrates 520 and 524. Electrodes 528 and 532 and landings 536 and 540 may be respectively coupled to the spacers 512 and 516 as shown. The spacers 512 and 516 may have a reflective surface opposite the surface coupled with the electrodes 528 and 532. When a gate 544 of the valvelet 504 is in the open position, light striking the reflective surface of the spacer 512 may be reflected. Likewise, light striking the reflective surface of the open gate 544 may also be reflected. By providing for these complementary reflections through the valvelet 504 the cone angle of the illumination may be substantially unchanged throughout transmission. That is, the distribution of angles of the incoming light may be approximately the same as the distribution of the angles of the transmitted light. For similar reasons, gates of other embodiments may have reflective surfaces on both sides.

In one embodiment, the spacer 512 may be made of a dielectric material that may facilitate the prevention of interference from the electrode 528 with the gate 544.

Figure 6:
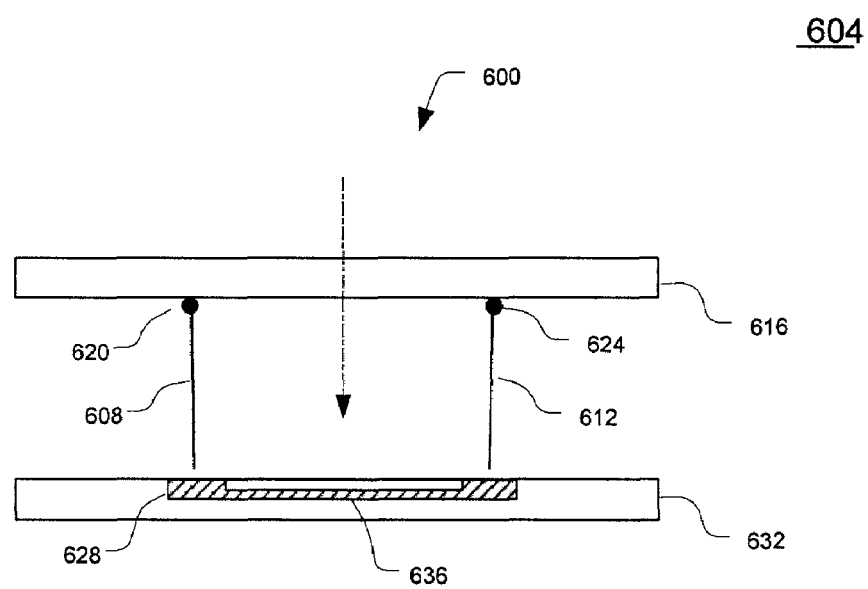
FIG. 6 illustrates a top-view of a valvelet of a transmissive electromechanical light valve having two gates, in accordance with another embodiment of the present invention.

FIG. 6 illustrates a top-view of a valvelet 600 of a light valve 604 in accordance with an embodiment of the present invention. The valvelet 600 may include gates 608 and 612 coupled to a substrate 616 by respective hinges 620 and 624. An electrode 628 is embedded in substrate 632. In this embodiment, the elements may be similar to like-named elements discussed with reference to earlier embodiments. However, in this embodiment, the transmission of light through the valvelet 600 is modulated by the pair of gates 608 and 612. The embedded electrode 628 may have a central portion 636 that is overlaid with a dielectric material, which could be a similar material as that found in the remaining substrate 632. This design could facilitate the attractive electromagnetic force between the gates 608 and 612 and the electrode 628 being greater at the periphery of the valvelet 600 than at the center. This could, in turn, facilitate a full extension of the gates 608 and 612 while in the open position.

Figure 7:
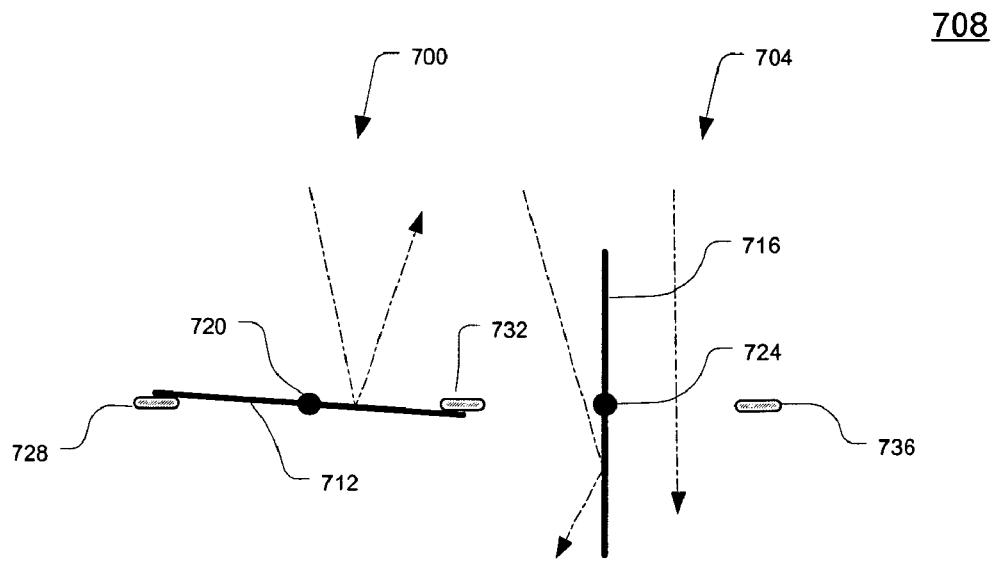
FIG. 7 illustrates a top-view of a transmissive electromechanical light valve having hinges placed in the center of gates, in accordance with another embodiment of the present invention.

FIG. 7 illustrates a top-view of valvelets 700 and 704 of a light valve 708 in accordance with an embodiment of the present invention. Valvelets 700 and 704 may include gates 712 and 716 that are coupled to hinges 720 and 724, respectively. The hinges 720 and 724 may be located approximately at the centerlines of the respective gates 712 and 716.

In this embodiment, the gates 712 and 716 may cooperate with the addressing electrodes 728, 732, and 736 to effectuate an electromagnetic force resulting in the valvelet 700 being in a closed position, and the valvelet 704 being in an open position. One or more substrates (not shown) may be coupled to the valvelets 700 and 704 to provide sufficient structure while allowing the rotation of the gates 712 and 716 through the open and closed positions.

Figure 8:
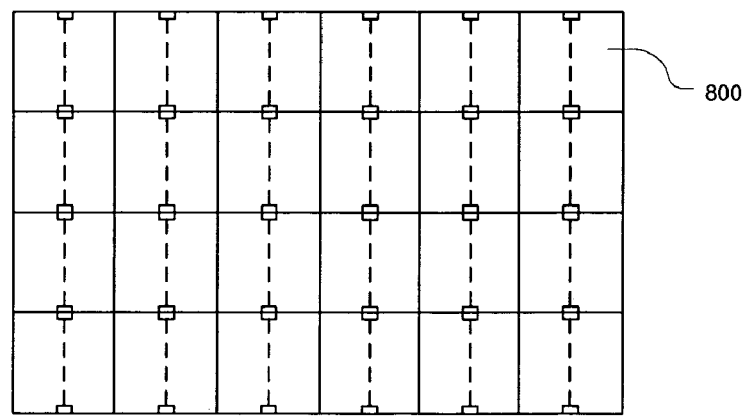
FIG. 8 illustrates a front-view of a transmissive electromechanical light valve in accordance with an embodiment of the present invention.

FIG. 8 illustrates a front-view of a rectangular array of valvelets 800 of a light valve 804 in accordance with an embodiment of the present invention. The valvelets 800 may be similar to the valvelets 700 and 704 described and discussed above with reference to FIG. 7. Additionally, some or all of the valvelets 800 may be interchanged with any of the valvelets discussed and described with reference to earlier embodiments.

Referring also to FIGS. 1-2, the face of the light valve 804 may be illuminated by illumination arrangement 112. The valvelets 800 may be individually controlled to allow or prevent the transmission of light through the light valve 804 to effectuate an image pattern conveyed by control signals from the controller 116. The pattern of transmitted light may then be imaged onto a viewing device through projection optics 124.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A system comprising:
a color wheel; and
a light valve adapted to receive light along an illumination path through the color wheel, comprising:
a transparent substrate having a surface; and
a valvelet, coupled to the substrate, having
an opening,
a gate disposed at the opening and adapted to be pivotable between a first position to allow light to pass through a first portion of the opening and a second position to prevent light from passing through the first portion;
a hinge coupled to the surface and to the gate and adapted to allow the gate to pivot between the first and the second position;
an electrode coupled to the surface and adapted to provide an electromagnetic force to facilitate the gate pivoting between the first and the second positions; and
a landing coupled to the surface and adapted to position the gate a distance from the electrode while the gate is in the second position.

2. The system of claim 1, further comprising:
another gate adapted to be pivotable, in conjunction with the gate, between a third position to allow light to pass through a second portion of the opening and a fourth position to prevent light from passing through the second portion, the first and second portion including the entire opening.

3. A system comprising:
a color wheel;
a controller adapted to receive an image signal and to output a light valve control signal representing an image;
a light source adapted to provide light to the color wheel along an illumination path; and
a light valve adapted to receive the light along the illumination path through the color wheel, to receive the light valve control signal, and to render the image by transmitting portions of the light through a plurality of openings of a respective plurality of valvelets by selectively rotating one or more gates disposed at each of the plurality of openings from a first position to a second position.

4. The system of claim 3, further comprising:
projection optics, on a projection path, adapted to receive and project the transmitted portions of the light.

5. The system of claim 3, wherein the light valve further comprises:
a substrate coupled to the one or more gates through one or more respective hinges, the one or more respective hinges adapted to facilitate the one or more gates rotating between the first and the second positions.

6. The system of claim 3, wherein the light valve further comprises:
one or more electrodes electromagnetically coupled to corresponding ones of the one or more gates, and adapted to facilitate an electromagnetic force to rotate selected ones of the one or more gates between the first position and the second position.

7. The system of claim 3, further comprising:
an input device coupled to the controller and adapted to transmit the image signal to the controller.

8. The system of claim 7, wherein the input device is a selected one of a group consisting of a digital versatile disk (DVD), a set-top box (STB), and an integrated television tuner.

9. A light valve comprising:
a first substrate;
a second substrate;
a plurality of spacers between the first substrate and the second substrate, the plurality of spacers being orthogonal to the first substrate or the second substrate; and
a plurality of valvelets coupled to the first substrate, each of the plurality of valvelets having
a gate adapted to be pivotable between a first position to allow light to pass through the respective valvelet and a second position to prevent light from passing through the respective valvelet, and
an electrode, positioned on the spacer adjacent to the gate, and adapted to provide an electromagnetic force to facilitate the gate pivoting between the first and the second positions.

10. The light valve of claim 9, wherein in each of the plurality of valvelets the gate comprises a reflective surface.

11. The system of claim 3, wherein the light valve is further adapted to render the image by blocking other portions of the light from passing through another plurality of opening of a respective another plurality of valvelets by selectively rotating one or more gates disposed at each of the another plurality of openings from a second position to a first position, said blocking other portions of the light occurring simultaneously with said transmitting the portions of the light.

12. A system comprising:
a color wheel;
a controller adapted to receive an image signal and to output a light valve control signal representing an image;
a light source adapted to provide light to the color wheel along an illumination path; and
a light valve, having a plurality of valvelets, each having one or more gates, the light valve adapted to receive the light along the illumination path through the color wheel, to receive the light valve control signal, and to render the image by simultaneously positioning the one or more gates of a first set of the plurality of valvelets in a first position to transmit a first portion of the light and positioning the one or more gates of a second set of the plurality of valvelets in a second position to block a second portion of the light.

13. The system of claim 12, wherein the light valve further comprises:
one or more electrodes electromagnetically coupled to corresponding ones of the one or more gates of the plurality of valvelets, and adapted to facilitate an electromagnetic force to rotate selected ones of the one or more gates between the first position and the second position.

14. The light valve of claim 9, wherein each of the plurality of valvelets further comprises:
a hinge coupled to a surface of the first substrate and to the gate and adapted to allow the gate to pivot between the first and the second positions.

15. The light valve of claim 14, wherein each of the plurality of valvelets further comprises:
a landing coupled to corresponding each of the plurality of spacers and adapted to position the gate a distance from the electrode while the gate is in the first position.

* * * * *